United States Patent
Muller et al.

(10) Patent No.: US 7,248,720 B2
(45) Date of Patent: Jul. 24, 2007

(54) METHOD AND SYSTEM FOR GENERATING A COMBINED RETINA/IRIS PATTERN BIOMETRIC

(75) Inventors: David F. Muller, Boston, MA (US); Gregory L. Heacock, Auburn, WA (US); David B. Usher, Waltham, MA (US)

(73) Assignee: Retica Systems, Inc., Waltham, MA (US)

( * ) Notice: Subject to any disclaimer, the term of this patent is extended or adjusted under 35 U.S.C. 154(b) by 0 days.

(21) Appl. No.: 11/087,205

(22) Filed: Mar. 23, 2005

(65) Prior Publication Data

US 2006/0088193 A1    Apr. 27, 2006

Related U.S. Application Data

(60) Provisional application No. 60/621,124, filed on Oct. 21, 2004.

(51) Int. Cl.
*G06K 9/00* (2006.01)

(52) U.S. Cl. .................. 382/117; 382/115; 382/294

(58) Field of Classification Search ............... 382/117
See application file for complete search history.

(56) References Cited

U.S. PATENT DOCUMENTS

| | | | | |
|---|---|---|---|---|
| 4,109,237 A | * | 8/1978 | Hill | 382/117 |
| 4,641,349 A | * | 2/1987 | Flom et al. | 382/117 |
| 5,016,282 A | * | 5/1991 | Tomono et al. | 382/117 |
| 5,063,604 A | * | 11/1991 | Weiman | 382/170 |
| 5,214,455 A | * | 5/1993 | Penney et al. | 351/210 |
| 5,240,006 A | * | 8/1993 | Fujii et al. | 600/425 |
| 5,291,560 A | * | 3/1994 | Daugman | 382/117 |
| 5,543,866 A | * | 8/1996 | Van de Velde | 351/221 |
| 5,568,208 A | * | 10/1996 | Van de Velde | 351/221 |
| 5,572,596 A | * | 11/1996 | Wildes et al. | 382/117 |
| 5,867,587 A | * | 2/1999 | Aboutalib et al. | 382/117 |
| 5,956,122 A | * | 9/1999 | Doster | 351/210 |
| 5,990,973 A | * | 11/1999 | Sakamoto | 348/576 |
| 5,995,014 A | * | 11/1999 | DiMaria | 340/5.52 |
| 6,000,799 A | * | 12/1999 | Van de Velde | 351/205 |
| 6,035,054 A | * | 3/2000 | Odaka et al. | 382/117 |
| 6,047,281 A | * | 4/2000 | Wilson et al. | 707/3 |
| 6,055,322 A | * | 4/2000 | Salganicoff et al. | 382/117 |
| 6,072,892 A | * | 6/2000 | Kim | 382/117 |
| 6,081,607 A | * | 6/2000 | Mori et al. | 382/110 |

(Continued)

OTHER PUBLICATIONS

Jain, A.K., Ross, A., Prabhakar, S., "An Introduction to Biometric Recognition", Circuits and Systems for Video Technology, IEEE Transactions on, Jan. 2004, ISSN: 1051-8215.*

(Continued)

*Primary Examiner*—Matthew C. Bella
*Assistant Examiner*—Sath V. Perungavoor
(74) *Attorney, Agent, or Firm*—McAndrews, Held & Malloy, Ltd.

(57) ABSTRACT

A method and system generates correlated biometric information by capturing an image of a retinal vessel pattern and simultaneously capturing an image of an iris minutia pattern. Retinal biometric data and iris biometric data are generated from the images. The retinal biometric data and the iris biometric data are then combined or linked to maintain the correlation between the two biometrics.

21 Claims, 4 Drawing Sheets

U.S. PATENT DOCUMENTS

| | | | |
|---|---|---|---|
| 6,139,145 A * | 10/2000 | Israel | 351/160 R |
| 6,229,905 B1 * | 5/2001 | Suzaki | 382/110 |
| 6,453,057 B1 * | 9/2002 | Marshall et al. | 382/117 |
| 6,546,122 B1 * | 4/2003 | Russo | 382/125 |
| 6,668,072 B1 * | 12/2003 | Hribernig et al. | 382/124 |
| 6,711,280 B2 * | 3/2004 | Stafsudd et al. | 382/106 |
| 6,714,665 B1 * | 3/2004 | Hanna et al. | 382/117 |
| 6,744,909 B1 * | 6/2004 | Kostrzewski et al. | 382/115 |
| 6,757,409 B2 * | 6/2004 | Marshall et al. | 382/117 |
| 6,785,406 B1 * | 8/2004 | Kamada | 382/117 |
| 2001/0036297 A1 * | 11/2001 | Ikegami et al. | 382/115 |
| 2002/0027992 A1 * | 3/2002 | Matsuyama et al. | 380/231 |
| 2002/0093645 A1 * | 7/2002 | Heacock | 356/138 |
| 2002/0118864 A1 * | 8/2002 | Kondo et al. | 382/117 |
| 2002/0136435 A1 * | 9/2002 | Prokoski | 382/118 |
| 2003/0095689 A1 * | 5/2003 | Vollkommer et al. | 382/117 |
| 2004/0091136 A1 * | 5/2004 | Dombrowski | 382/115 |
| 2004/0101168 A1 * | 5/2004 | Kostrzewski et al. | 382/115 |
| 2004/0114784 A1 * | 6/2004 | Fujii | 382/124 |
| 2004/0170304 A1 * | 9/2004 | Haven et al. | 382/115 |
| 2004/0190759 A1 * | 9/2004 | Caldwell | 382/117 |
| 2004/0252866 A1 * | 12/2004 | Tisse et al. | 382/117 |
| 2005/0008200 A1 * | 1/2005 | Azuma et al. | 382/117 |
| 2005/0098621 A1 * | 5/2005 | de Sylva | 235/379 |
| 2006/0147095 A1 * | 7/2006 | Usher et al. | 382/117 |

OTHER PUBLICATIONS

Ross, A., Jain, A.K., "Multimodal Biometrics: An Overview", Proc. of 12th European Signal Processing Conference (EUSIPCO), Sep. 2004, pp. 1221-1224.*

Jain, A,K., Ross, A., Prabhakar, S., An Introduction to Biometric Recognition, Jan. 2004, Circuits and Systems for Video Technology, IEEE Trans., ISSN: 1051-8/215/04 entire document.

* cited by examiner

METHOD AND SYSTEM FOR GENERATING A COMBINED RETINA/IRIS PATTERN BIOMETRIC

CROSS-REFERENCE TO RELATED APPLICATIONS

The present application claims the priority of Provisional Patent Application Ser. No. 60/621,124 filed Oct. 21, 2004. That application is hereby incorporated herein by reference. This application is related to U.S. patent application Ser. No. 10/038,168 filed Oct. 23, 2001; U.S. Pat. No. 6,453,057 issued Sep. 17, 2002 and U.S. Pat. No. 6,757,409 issued Jun. 29, 2004. This application is also related to U.S. patent application Ser. No. 11/028,726 filed Jan. 3, 2005 and to U.S. patent application Ser. No. 10/038,168 filed Oct. 23, 2001.

STATEMENT REGARDING FEDERALLY SPONSORED RESEARCH OR DEVELOPMENT

N/A

TECHNICAL FIELD

The present invention is directed to a method and system for generating biometric information for use in known human or animal identification and more particularly, to such a method and system for generating a combined biometric from a retinal vessel pattern and an iris minutia pattern.

BACKGROUND OF THE INVENTION

Systems are known for using a retinal vessel pattern to identify an individual. Such systems are described, for example, in U.S. Pat. Nos. 6,453,057 and 6,757,409. Systems are also know for using an iris minutia pattern to identify an individual. Such systems are described in U.S. Pat. Nos. 4,641,349; 5,291,560 and 5,956,122. In the system described in the latter patent, light reflected from the retina, which is seen by the system as "two glowing spots," is used to direct the view of a fine focus camera to an iris so that the iris can be used to produce a biometric. The system of the U.S. Pat. No. 5,956,122 does not capture a retinal vessel pattern or use the retina to provide biometric information, its use being limited to generally locating an iris. Further, it has been found that systems which use an iris pattern have inherent problems associated with providing accurate and complete data because portions of the iris can be blocked by eyelids and eyelashes.

BRIEF SUMMARY OF THE INVENTION

In accordance with the present invention, the disadvantages of the prior art discussed above have been overcome. The method and system of the present invention generates combined biometric information from a retinal vessel pattern and an iris minutia pattern. The combined retinal/iris pattern biometric is more accurate than biometrics using only the iris or only the retina. Moreover, since the vessel pattern of the retina is actually and permanently correlated with the iris pattern, the combined biometric information generated by the method and system of the present invention is much more accurate and reliable than a combination of unrelated biometrics.

More particularly, in accordance with one feature of the method and system of the present invention, a biometric is generated by capturing an image of a retinal vessel pattern; capturing an image of an iris minutia pattern; and correlating the spatial distribution of the retinal vessel pattern and the iris minutia pattern to provide combined biometric information.

In accordance with another feature of the present invention, biometric information is generated by capturing an image of a retinal vessel pattern; capturing an image of an iris minutia pattern having a defined correlation with the captured retinal vessel pattern; and generating a retina biometric representing at least a portion of the captured retinal vessel pattern and an iris biometric representing at least a portion of an iris minutia pattern, wherein the retina biometric and the iris biometric are correlated.

In accordance with still another feature of the present invention, the image of the iris minutia pattern and the image of the retinal vessel pattern are captured at the same time or near in time. In a preferred embodiment, these images are captured within two seconds of each other.

In accordance with a further feature of the method and system of the present invention, the retina is illuminated with light of a first wavelength, the light of the first wavelength being reflected from the retina to a first image capturing device. The iris is illuminated with light of a second wavelength that is different from the first wavelength, the light of the second wavelength being reflected from an iris to a second image capturing device. The first wavelength of light is selected to provide enhanced contrast between the retinal vessel pattern and background in the captured image. Similarly, the second wavelength of light is selected to provide enhanced contrast for the iris minutia pattern.

In accordance with another feature of the method and system of the present invention, biometric information is generated by capturing an image of a retinal vessel pattern and simultaneously capturing an image of an iris minutia pattern to provide a combined image that is a bit map of at least a portion of the iris minutia pattern superimposed on at least a portion of the retinal vessel pattern.

In accordance with another feature of the method and system of the present invention, a biometric is generated by directing light to reflect from a retina; directing light to reflect from an iris; and capturing a combined image of the light reflected from the retina and the iris for use as biometric information.

In accordance with another feature of the method and system of the present invention, the light reflected by the retina is used to define an inner perimeter of the iris or an outer perimeter of a pupil.

These and other advantages and novel features of the present invention, as well as details of an illustrated embodiment thereof, will be more fully understood from the following description and drawings.

DETAILED DESCRIPTION OF THE INVENTION

Figure 1:
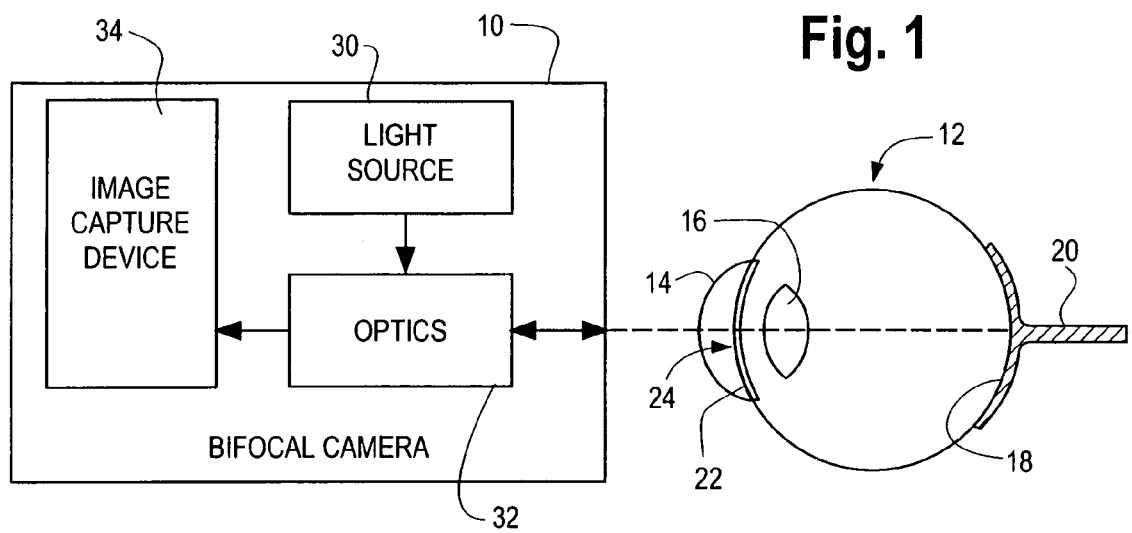
FIG. 1 is a block diagram of a system in accordance with the present invention for generating a combined retinal/iris pattern biometric.

The present invention includes a camera system 10 for generating a unique biometric from information captured at two distinct but interrelated locations in a human or animal eye 12. In a preferred embodiment, the biometric is a combined image of a retinal vessel pattern and iris minutia pattern. Light enters the eye through the cornea 14 and is directed by the lens 16 to the retina 18 which is the sensory membrane of the eye. The image received by the retina 18 from the lens 16 is coupled to the brain by the optic nerve 20. The iris 22 is the colored portion of the eye that surrounds the pupil 24 which is an aperture in the eye. The retina has a retinal vessel pattern that is unique to a given individual or animal. Similarly, the iris has a minutia pattern that is also unique to a given individual or animal. The minutia that can be measured or detected in the iris includes striations, pits and/or furrows.

The iris and retina are biometric features that are both independent and strongly coupled. They are independent in that they are extracted from different biological structures. The iris and retina biometric features are strongly coupled because there is a fixed geometric relationship between the iris and the retina. Specifically, the position and orientation of the eye is reflected simultaneously in both the iris and the retina. Further, the iris and retina biometric features are on the same scale. The strong coupling between the iris and retina biometric features not only facilitates the simultaneous capture of both the iris and retina biometric features, but allows these features to be cross-referenced or combined in a common feature space that preserves the geometric relationship between the iris and retina.

The bifocal camera system 10 generates a biometric of these strongly coupled features by capturing an image of a retinal vessel pattern; capturing an image of an iris minutia pattern; and correlating the spatial distribution of the retinal vessel pattern and the iris minutia pattern to provide a combined retinal/iris pattern biometric.

More particularly, the camera system 10 includes one or more light sources 30 such as LED(s) that directs light to optics 32. The optics 32 include at least one partially reflective mirror that directs light to the eye 12 and that passes light reflected from the eye 12 to a digital image capture device 34. The optics 32 also include a bifocal lens system with one or more lenses so that light from the light source 30 is directed to reflect from the retina 18 wherein the light reflected from the retina 18 represents a retinal vessel pattern. The bifocal lens system also directs light from the light source 30 to reflect the light from the iris, the light reflected from the iris representing an iris minutia pattern. In one embodiment, the light reflected by the retina 18 and the light reflected by the iris 22 are simultaneously captured by the digital image capture device 34 so as to capture a combined image of a retinal vessel pattern and an iris minutia pattern that can be used as a biometric. The digital image capture device 34 may be a charged coupled device, CCD, for example, with electronics that convert the pixel or bit mapped image to a digital representation of that image. In another embodiment, described in detail below, the image capture device 34 is formed of two CCDs that respectively capture an image of a retinal vessel pattern and an image of an iris minutia pattern at the same time or near in time. In this embodiment, a retina biometric representing at least a portion of the captured retinal vessel pattern and an iris biometric representing at least a portion of the iris minutia pattern are generated wherein the retina and iris biometrics are correlated. These correlated biometrics can be combined together to form one biometric or they can be linked so that they can be analyzed as either one biometric or as two separate biometrics. In the various embodiments of the present invention, the combined retinal pattern and iris pattern biometric information provides a unique biometric that can be used to identify an individual or animal.

Figure 2:
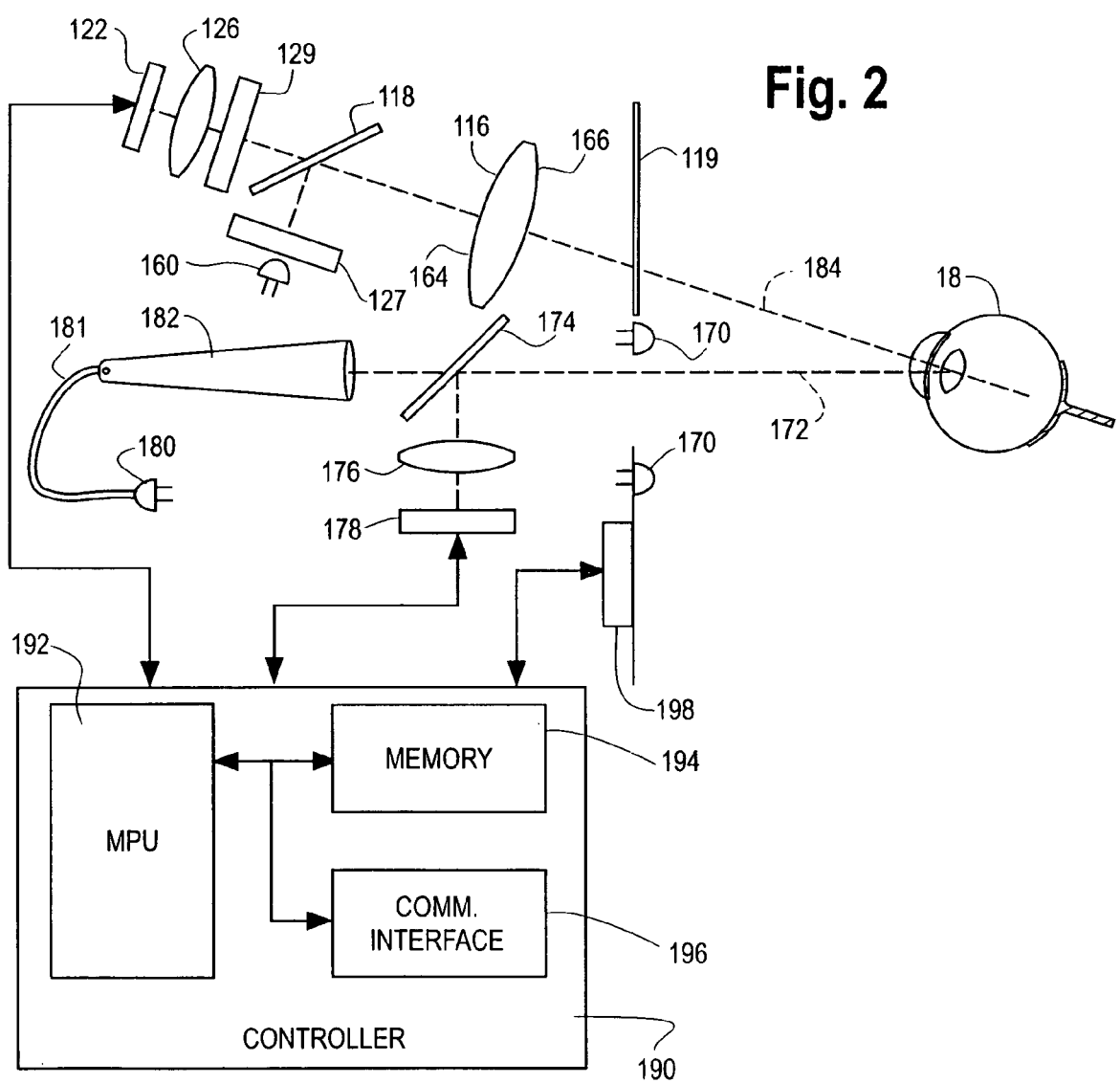
FIG. 2 is an illustration of a system in accordance with one embodiment of the present invention for capturing strongly coupled images of an iris and retina that provide correlated biometric information.

As shown in FIG. 2, the camera system 110 of one embodiment of the present invention includes at least one light emitting diode (LED) 160 to provide light for illuminating an area of the retina 18 containing the optic disk. The LED 160 is preferably a red LED having a wavelength of approximately 660 nm for enhanced contrast between the blood vessels of the retina and the background of the captured retinal image. The light from the LED 160 is directed to the retina 18 by a partially reflecting mirror 118 and an objective lens 116 which determines an image field angle. The lens preferably has an effective focal length between 115 and 130 millimeters. In particular, light from the LED 160 is reflected by the mirror 118 through the objective lens 116 and dichroic mirror 119 to illuminate an area of the retina about a point intersecting a centerline 184 of the lens 116.

Light reflected from the illuminated area of the retina 18 and having a wavelength of 660 nm±50 nm passes through the dichroic mirror 119 whereas light of substantially all other wavelengths are reflected by the dichroic mirror 119. The light that passes through the dichroic mirror 119 is picked up by the objective lens 116. The objective lens 116 directs the light reflected from the retina through the partially reflective mirror 118 to a pin hole lens or field lens 126 that is positioned in front of and with respect to the image capturing surface of a retinal image sensor. The retinal image sensor may be a CCD 122, a CMOS image sensor or other image capturing device. The pin hole lens or field lens 126 ensures that the system 110 has a large depth of focus so as to accommodate a wide range of eye optical powers. The CCD 122 captures an image of the light reflected from the illuminated area of the retina and generates a signal representing the captured image. In a preferred embodiment, the center of the CCD 122 is generally aligned with the centerline of the lens 116 so that the central, i.e. principal image captured is an individual's optic disk. It is noted that in a preferred embodiment of the invention the CCD 122 provides digital bit mapped image data representing the captured image.

In a preferred embodiment, a pair of polarizers 127 and 129 that are cross-polarized are inserted into the optical path of the system to eliminate unwanted reflections that can impair the captured image. More particularly, the polarizer 127 is disposed between the light source 160 and the partially reflecting mirror 118 so as to polarize the light from the source 160 in a first direction. The polarizer 129 is such that it will not pass light polarized in the first direction. As such, the polarizer 129 prevents light from the LED 160 from reaching the CCD 122. The polarized light from the LED 160 becomes randomized as the light passes through the tissues of the eye to the retina so that the light reflected from the retina to the lens 116 is generally unpolarized and will pass through the polarizer 129 to the CCD 122. However, any polarized light from the LED 160 reflecting off of the cornea 131 of the eye will still be polarized in the first direction and will not pass through the polarizer 129 to the CCD 122. Thus, the polarizers 127 and 129 prevent unwanted reflections from the light source 160 and cornea 131 from reaching the CCD 122 so that the captured image does not contain bright spots representing unwanted reflections. If desired, a third polarizer 133 as shown in FIG. 1 can be positioned generally parallel to the polarizer 127 but on the opposite side of the partially reflective mirror 118 to eliminate unwanted reflections in that area of the housing as well. This third polarizer may or may not be needed depending on the configuration of the system.

In a preferred embodiment, the objective lens 116 has a first surface 164 and a second surface 166, one or both of which are formed as a rotationally symmetric aspheric surface defined by the following equation.

$$Z = \frac{Cr^2}{1 + \sqrt{1-(1+k)C^2r^2}} + A_1r^2 + A_2r^4 + A_3r^6.$$

By forming one or both of the surfaces 164, 166 of the lens 116 as a rotationally symmetric asphere, the quality of the image captured can be substantially increased.

The system 110 also includes a light source with one or more light emitting diodes to provide light for illuminating the iris 22. In a preferred embodiment, the light source includes a number of LEDs 170 disposed in a ring about an axis 172 that intersects the pupil 24 when an eye is properly aligned with the system 110. For example, sixteen LEDs can be disposed in a ring about the axis 172. At least two of those LEDs generate light having a wavelength in the near infrared region, e.g. 800 nm, so as to illuminate the iris to provide enhanced contrast between the iris minutia pattern and background in the captured image thereof. In a preferred embodiment, the light from the sixteen LEDs is coupled by respective optical fibers to the output ends of the fibers which are aligned in a ring in the housing of the system 110 about the axis 172 so that a ring of light projects from the housing about the axis 172. The near infrared light reflected from the iris 22 is reflected by a dichroic mirror 174 to a pin hole lens or field lens 176. The dichroic mirror 174 reflects infrared light of a wavelength of approximately 800 nm and passes green light from an alignment LED 180. The pin hole lens or field lens 176 focuses the reflected image of the iris 22 onto a second CCD 178, a CMOS image sensor or other image capturing device to capture an image of the iris 22. It is noted that two or three polarizers can be inserted into the optical path associated with the iris image capturing portion of the system 110 similar to the polarizers described above for the retinal image capturing portion of the system.

Light from the green alignment LED 180 is coupled by an optical fiber 181 to an end thereof positioned along the axis 172 of an alignment tube 182. Alternatively, the alignment LED 180, itself, may be positioned on the axis 172 of the alignment tube 182. Light from the alignment LED 180, centered in the tube 182, forms a visual target to which the eye is directed. When an eye focuses on the green light of the LED 180, the axis 172 intersects the pupil 24 of the eye so that the generally central image captured by the CCD 178 is an image of the iris 22. The axis 184 of the retinal image capturing CCD 122 and retina objective lens 116 is 15° from the central iris capturing axis 172 of the iris capturing CCD 178 and the alignment LED 180 and tube 182. The axis 184 is at a 15° angle from the axis 172 so that when an eye is focused on the alignment LED 180 such that the central iris capturing axis 172 intersects the pupil, then the central retina capturing axis 184 will intersect the optic disk and optic nerve of the eye. As such, the central image captured by the retina capturing CCD 122 is the optic disk.

The system 110 further includes a controller 190 to control the time at which the image capturing devices 122 and 178 respectively capture images of the retina and iris and couple digital representations thereof to the controller 190 for analysis. The controller 190 preferably includes a microprocessor 192 and associated memory 194. The microprocessor 192 may analyze the captured retinal and iris images to generate a respective retina biometric and an iris biometric which are combined or linked together as described below. Alternatively, the microprocessor 192 may store the captured and correlated images for transmission via a communication interface 196 to a remote computer for analysis and to generate the respective retina biometric, iris biometric and combined or linked biometric information. In this embodiment, before transmitting data representing the captured images, the microprocessor 192 preferably determines whether the captured images are sufficient to provide identification data, i.e. data used to identify an individual or animal. For example, the microprocessor 192 can control the CCD 122 to capture an image of the retina and within seconds determine whether the captured image is sufficient to provide retinal biometric data as discussed in detail in U.S. patent application Ser. No. 11/028,726 filed Jan. 2, 2005, assigned to the assignee of the present invention and incorporated herein by reference. If the retinal image is determined to be sufficient, the microprocessor controls the CCD 172 to capture an image of the iris "simultaneously" with the captured retinal image that was determined to be sufficient for providing biometric data. As used herein the term simultaneously means at the same time or near in time, e.g. within approximately two seconds, so that the captured retina and iris images are correlated.

The microprocessor controls the retinal image capturing device 122 and/or iris image capturing device 178 in response to an alignment signal that indicates that an eye is properly aligned with the system 110. Proper alignment is when the axis 172 intersects the pupil 24 of the eye and the axis 184 intersects the optic disk. The alignment signal may be generated by a switch or the like that is manually actuated by a user or another person when the user's eye is focused on the green alignment LED 180. Alternatively, the system can automatically detect when the eye is in sufficient alignment with the system 110 so that an image of the retina and an image of the iris can be captured to provide adequate biometric information. In this embodiment, the system 110 includes a proximity detector in the form of a transducer 198 such as an ultrasound transducer so as to determine when an individual is at a predetermined distance from the system 110. The ultrasound transducer 198 is positioned adjacent the alignment channel 199 and preferably below the channel 199. The transducer 198 is operated in a transmit and a receive mode. In the transmit mode, the ultrasound transducer 198 generates an ultrasound wave that reflects off of an area of the user's face just below the eye, such as the user's cheek. The ultrasound wave reflected off user's face is picked up by the transducer 198 in a receive mode. From the time at which the wave is sent, the time at which the wave is received and the speed of the wave through air, the distance between the system 110 and the individual can be determined by the microprocessor 192 or a dedicated integrated circuit (I.C.). The microprocessor 198 or I.C. compares the determined distance between the eye and the system 110 to a predetermined distance value stored in the memory 194, a register or the like, accessible by the microprocessor 192 or I.C. When the microprocessor 192 determines from the output of the ultrasound transducer 198 that the individual is at a predetermined or correct distance, the microprocessor 198 signals the CCD 122 to actuate the CCD 122 to capture an image of an area of the retina including the optic disk. Simultaneously, the microprocessor 198 may signal the CCD 178 to actuate the CCD 178 to capture an image of the iris 22. In one embodiment, the microprocessor 198 first controls the CCD 122 to capture an image of the retina which is immediately analyzed by the microprocessor 198 to determine whether the image of the retina captured is sufficient to provide biometric information as discussed above. When a sufficient retinal image is captured, the microprocessor 198 signals the CCD 178 to capture an image of the iris 22. In this embodiment, the microprocessor 192 analyzes the captured image of the retina for sufficiency to provide a biometric so quickly that the microprocessor 192 can signal the CCD 178 to capture an image of the iris near enough in time to the captured image of the retina so that the images are correlated and can be considered simultaneously captured as the term simultaneously is used herein.

Figure 5:
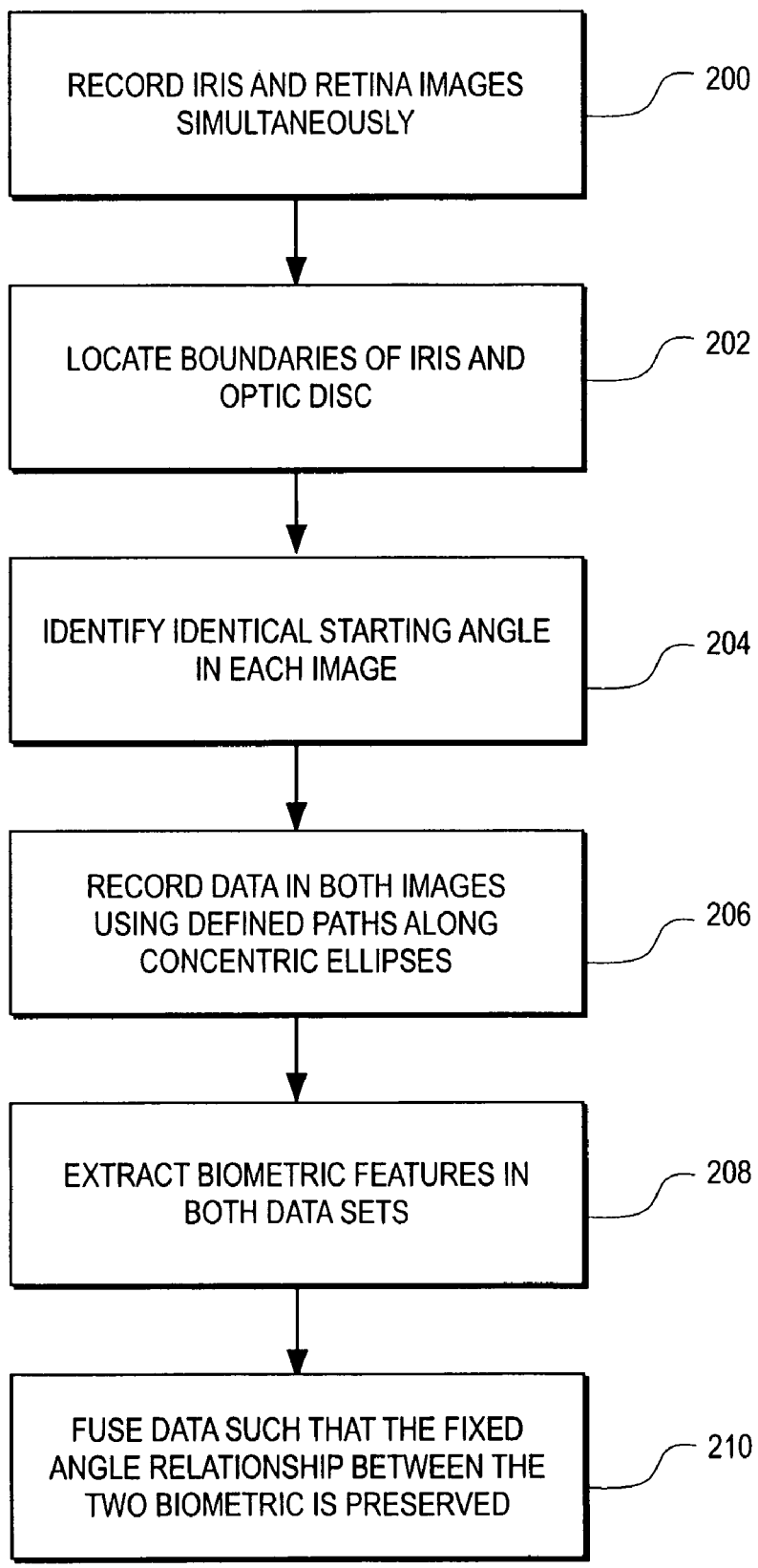
FIG. 5 is a flow chart illustrating the operation of a processor of the system for generating combined retinal and iris biometric information.

The microprocessor 192, alone or in combination with a remote computer, generates correlated retina and iris biometric information as shown in the flow chart of FIG. 5. Specifically, the microprocessor 192 can carry out all of the steps shown in FIG. 5 or the microprocessor 192 can carry out one or more of the steps depicted in FIG. 5 and the remote computer can carry out the remaining steps. The microprocessor 192 at block 200 controls the iris and retina image capturing devices 122 and 178 to simultaneously, i.e. at or near the same time, capture images of the retina and iris that are correlated. Thereafter, the processor, i.e. the microprocessor 192 or remote computer, at block 202 locates the boundaries of the iris and the optic disk.

Figure 3:
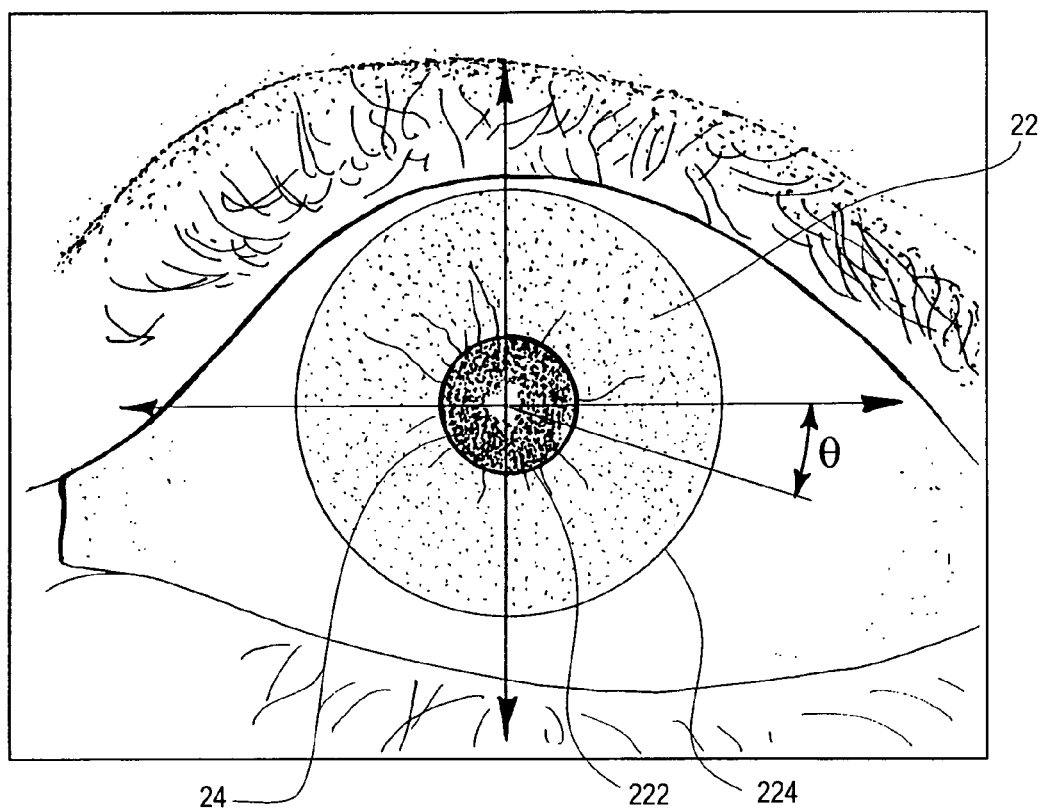
FIG. 3 is an illustration of a digital image of an iris with the boundaries of the iris being marked and X and Y axes being superimposed on the image.
Figure 4:
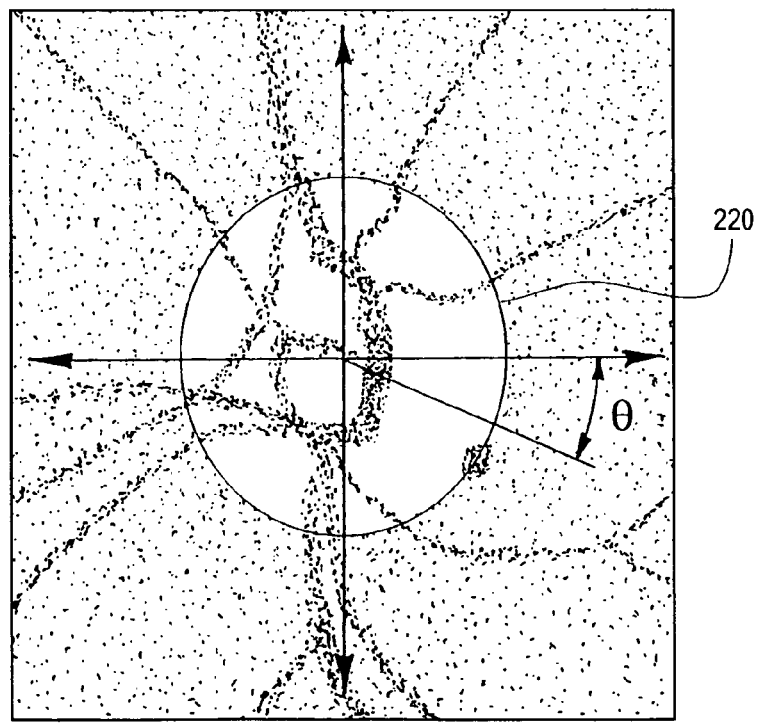
FIG. 4 is an illustration of a digital image of a retina with the optic disk being marked and X and Y axes being superimposed on the image.

The boundary of the optic disk is illustrated at 220 in FIG. 4. The boundary of the optic disk may be found using an algorithm such as disclosed in U.S. patent application Ser. No. 11/028,726 filed Jan. 3, 2005. The inner boundary 222 of the iris is also the boundary of the pupil 24 as shown in FIG. 3. The outer boundary of the iris 22 is depicted at 224. The processor can locate the boundaries 222 and 224 of the iris 22 in accordance with an algorithm similar to that disclosed in the patent application Ser. No. 11/028,726 for determining the boundary of the optic disk. Alternatively, the retinal illumination of the present invention can be utilized to locate the inner boundary 222 of the iris. In this embodiment, the light reflected from the retinal illumination source fills the pupil. The image of that light in the image of the iris captured by the image capturing device 178 is used to determine the outer perimeter of the pupil 24 which coincides with the inner boundary of the iris 22. This technique is especially useful in people with dark irises because of the low contrast between the iris and pupil.

The processor, at block 204 next identifies the same starting angle in each of the captured retinal and iris images. As shown in FIG. 3, an X axis and Y axis are superimposed on the captured image of an iris such that the intersection of the X and Y axes is centrally located in the image of the pupil 24. Similarly, as shown in FIG. 4, an X axis and Y axis are superimposed on the captured retinal image such that the intersection of the X and Y axes is centrally located in the image of the optic disk. The geometric relationship between the iris and retina fix a common reference frame between the two so that when digital images of the iris and retina are captured simultaneously, i.e. at or near the same time, a common reference frame between the two images can be set or calculated as illustrated in FIGS. 3 and 4 by the X and Y axes. As such, extracting the data from each of the captured images can be started at the same relative starting point to provide correlated biometric information. Obviously, the starting points may also be offset by a known amount or known angle to provide correlated biometric information as well. As long as the offset is known, the biometric information obtained is correlated. At block 206, the processor extracts data from both images using defined paths relative to concentric ellipses 220 and 224. Specifically, the retinal vessel pattern data within a predetermined distance of the boundary 220 of the optic disk can be extracted starting at the defined starting angle and moving through successive angles $\theta$. Similarly, the iris minutia pattern between the inner boundary 222 and outer boundary 224 can be extracted from the captured iris image starting with the same starting angle and moving through the same successive angles $\theta$ as used for extracting the retina data. The angle $\theta$ is necessarily the same in each biometric reference frame.

Figure 6A:
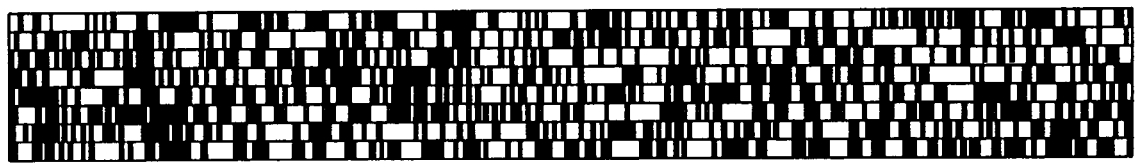
FIGS. 6A-C are respective illustrations of iris biometric data, correlated retinal biometric data, and linked iris and retinal biometric data.
Figure 6B:
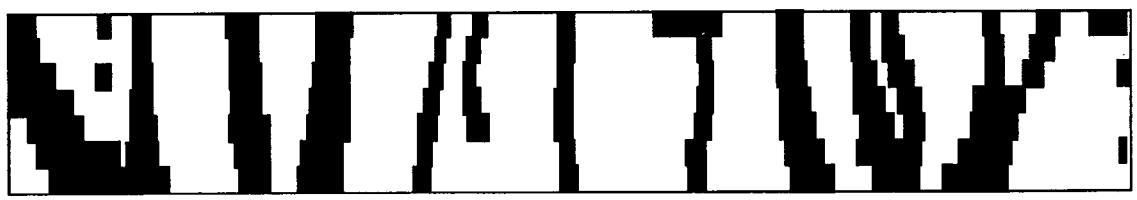
Figure 6C:
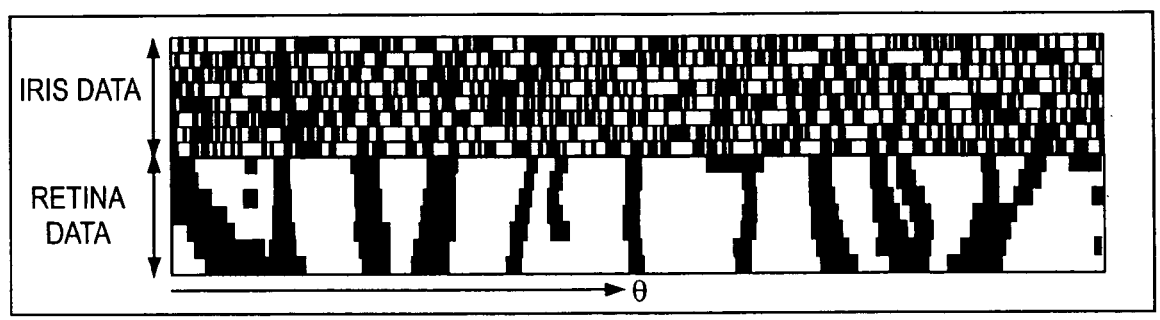

The retina biometric information and the iris biometric information can be combined or linked in a manner to take advantage of the coupling between the extracted iris and retina data. For example, FIG. 6A illustrates captured iris minutia data reduced to a binary representation or a barcode structure. Similarly, FIG. 6B shows an example of extracted retinal vessel pattern data reduced to a binary representation or a barcode structure. In each of FIGS. 6A and 6B, because the starting point at which the data was extracted is the same, and the data was extracted from both images using the same successive angles $\theta$, the iris barcode data and the retina barcode data can be vertically aligned to maintain the same starting point and linked together to form one biometric as depicted in FIG. 6C. The biometric of FIG. 6C maintains the angular correlation between the two extracted data sets. As can be seen from FIG. 6C, the biometric information shown therein can be analyzed as one biometric or as two separate biometrics, one representing the iris data and the other representing the retina data.

The method and system of the present invention have a number of advantages. First, the captured, correlated iris and retinal image data can be used to solve the problem that occurs in ocular biometric analysis when the head rotates. For example, in the case where only an iris biometric is generated, any variation in the rotational angle of the user's head, and therefore the eye needs to be taken into account. This can mean that for verification of an individual using an iris biometric, the extracted iris minutia pattern data needs to be matched to various stored iris biometric templates associated with multiple rotational angles. However, with the present invention utilizing the captured iris minutia pattern data and retinal vessel pattern data, since the rotational angle of the eye is fixed between the iris and retina, the features of one of these biometrics can be used to measure the angle of the other biometric. For example, if a match to a stored retinal biometric template is found at a particular angle, the iris biometric need only be matched to the corresponding stored iris biometric template at that angle and vice versa. In addition, it is possible to use landmarks or fiduciary points in one biometric that fix the rotational angle for the other biometric.

Another advantage of the iris-retina method and system of the present invention is that it is more robust, i.e. it is more difficult for someone to simulate another individual's iris and retina biometrics when they are simultaneously captured. Another advantage of the present invention is that because of the fixed relationship between the axes 172 and 184 of the iris and retina capturing devices, when the retinal image and iris images are simultaneously captured, the captured images are automatically correlated and can be analyzed to maintain this correlation fairly easily.

Moreover, in the event that there is an old database storing biometric data for only one of these biometrics, e.g. the iris, when new biometric data is obtained in accordance with the present invention, the coupling between the simultaneously acquired new iris biometric data and the new retina biometric data can be used to establish the same coupling between the new retina biometric data and the old stored iris biometric data. Once the relationship between the new data and the old data is established, the calculated relationship can be stored so that the old database can be used and is not obsolete.

Further, as discussed above, using different wavelengths of light to illuminate the iris and retina can enhance the contrast between the captured biometric information in each image and the background. The two different wavelengths of light may be used to illuminate the iris and the retina at the same time. Alternatively, the illumination of the retina and iris may be sequenced or flashed such that the microprocessor 192 actuates first the illumination source for the retina, then the illumination source for the iris or vise versa.

The method and system of the present invention generates images of both a retinal vessel pattern and an iris minutia pattern to provide biometric information that is more accurate than prior systems using only the iris or only the retina as a biometric. Moreover, since the retinal vessel pattern is actually and permanently correlated with the iris minutia pattern, the biometric information generated by the method and system of the present invention is more accurate and reliable than a combination of unrelated biometrics. Many modifications and variations of the present invention are possible in light of the above teachings. Thus, it is to be understood that, within the scope of the appended claims, the invention may be practiced otherwise than as described hereinabove.

What is claimed is:

1. A method for generating biometric information comprising:
   directing light of a first wavelength to reflect from a retina;
   directing light of a second wavelength different from the first wavelength to reflect from an iris at or near the same time that light of the first wavelength is directed to reflect from the retina; and
   capturing a combined image representing light reflected from the retina and light reflected from the iris to provide biometric information.

2. A method for generating biometric information as recited in claim 1 including using the light reflected from the retina to define an inner perimeter of the iris.

3. A method for generating biometric information as recited in claim 1 wherein the light reflected from the retina is used to define an outer perimeter of the pupil.

4. A method for generating biometric information comprising:
   illuminating the retina with light of a first wavelength to reflect light from a retina;
   illuminating the iris with light of a second wavelength different from the first wavelength to reflect the light from an iris;
   capturing an image of a retinal vessel pattern;
   capturing an image of an iris minutia pattern at or near the same time that the image of the retinal vessel pattern is captured, the iris minutia pattern having a defined correlation with the captured retinal vessel pattern; and
   generating a retina biometric representing at least a portion of the captured retinal vessel pattern and an iris biometric representing at least a portion of an iris minutia pattern, the retina biometric and the iris biometric being correlated.

5. A method for generating biometric information as recited in claim 4 wherein the retinal vessel pattern image and iris minutia pattern image are captured by separate image capturing devices.

6. A method for generating biometric information as recited in claim 4 wherein the retinal vessel pattern image and iris minutia pattern image are captured within two seconds of each other.

7. A method for generating biometric information comprising:
   illuminating the retina with light of a first wavelength to capture an image of a retinal vessel pattern;
   illuminating the iris with light of a second wavelength different than the first wavelength to capture an iris minutia pattern;
   capturing an image of a retinal vessel pattern with a first image capturing device;
   capturing an image of an iris minutia pattern with a second image capturing device at or near the same time that the image of the retinal vessel pattern is captured;
   generating a retina biometric representing at least a portion of the captured retinal vessel pattern;
   generating an iris biometric representing at least a portion of the captured iris minutia pattern; and
   linking the retina biometric with the iris biometric.

8. A method for generating biometric information as recited in claim 7 wherein the retinal vessel pattern image and iris minutia pattern image are captured within two seconds of each other.

9. A method for generating biometric information as recited in claim 7 wherein the retina and iris biometrics are linked so that the biometrics can be analyzed as one biometric or as two separate biometrics.

10. A method for generating biometric information comprising:
    capturing an image of a retinal vessel pattern;
    capturing an image of an iris minutia pattern at the same time or near the time that the image of the retinal vessel pattern is captured;
    generating a retina biometric representing at least a portion of the captured retinal vessel pattern;
    generating an iris biometric representing at least a portion of the captured iris minutia pattern;
    linking the retina biometric with the iris biometric; and
    using information derived from the captured retinal vessel pattern to determine a rotational angle for the captured iris minutia pattern.

11. A method for generating biometric information comprising:
  capturing an image of a retinal vessel pattern;
  capturing an image of an iris minutia pattern at the same time or near the time that the image of the retinal vessel pattern is captured;
  generating a retina biometric representing at least a portion of the captured retinal vessel pattern;
  generating an iris biometric representing at least a portion of the captured iris minutia pattern;
  linking the retina biometric with the iris biometric; and
  using information derived from the retina biometric to determine a rotational angle for the captured iris minutia pattern.

12. A method for generating biometric information comprising:
  directing an eye to look at a fixed location;
  illuminating the retina with light of a first wavelength to reflect light from a retina;
  illuminating the iris with light of a second wavelength different from the first wavelength to reflect the light from an iris;
  capturing an image of a retinal vessel pattern while the eye is directed to look at the fixed location;
  capturing an image of an iris minutia pattern while the eye is directed to look at the fixed location and at or near the same time that the image of the retinal vessel pattern is captured;
  generating a retina biometric representing at least a portion of the captured retinal vessel pattern; and
  generating an iris biometric representing at least a portion of the captured iris minutia pattern.

13. A method for generating biometric information as recited in claim 12 including correlating retina biometric information with iris biometric information.

14. A method for generating biometric information as recited in claim 12 including linking the retina biometric and the iris biometric.

15. A method for generating biometric information as recited in claim 14 wherein the retina and iris biometrics are linked in a manner to allow the biometrics to be analyzed as one biometric or as two separate biometrics.

16. A method for generating biometric information as recited in claim 12 wherein the first wavelength is within 50 nm of 660 nm and the second wavelength is within 50 nm of 800 nm.

17. A method for generating biometric information comprising:
  illuminating the retina with light of a first wavelength;
  illuminating the iris with light of a second wavelength different than the first wavelength at or near the same time that the retina is illuminated;
  passing light of the first wavelength reflected from the retina to an image capturing device without passing light of the second wavelength to the image capturing device to capture a retinal vessel pattern;
  capturing an image of an iris minutia pattern from light reflected from the iris;
  generating a retina biometric representing at least a portion of the captured retinal vessel pattern; and
  generating an iris biometric representing at least a portion of the captured iris minutia pattern.

18. A method for generating biometric information as recited in claim 17 including correlating retina biometric information with iris biometric information.

19. A method for generating biometric information as recited in claim 17 including linking the retina biometric and the iris biometric.

20. A method for generating biometric information as recited in claim 19 wherein the retina and iris biometrics are linked in a manner to allow the biometrics to be analyzed as one biometric or as two separate biometrics.

21. A system for generating biometric information comprising:
  a source of illumination light of a first wavelength for illuminating the retina;
  a source of illumination light of a second wavelength different from the first wavelength for illuminating the iris;
  a first image capturing device aligned relative to a first axis to capture a retinal vessel pattern from light reflected from a retina;
  a second image capture device aligned relative to a second axis to capture an iris minutia pattern from light reflected from an iris;
  a partial reflector on which light reflected from the retina impinges, the partial reflector passing light of the first wavelength to the image capture device and reflecting substantially all wavelengths of light other than the first wavelength of light; and
  a controller for controlling the first image capturing device and the second image capturing device to capture an image of the retina and iris.

\* \* \* \* \*